Dec. 9, 1969    W. S. ROUVEROL    3,482,461
TRANSMISSION
Filed May 5, 1967    3 Sheets-Sheet 1

INVENTOR.
WILLIAM S. ROUVEROL
BY Gordon Wood
ATTORNEY

Dec. 9, 1969   W. S. ROUVEROL   3,482,461
TRANSMISSION
Filed May 5, 1967   3 Sheets-Sheet 2

INVENTOR.
WILLIAM S. ROUVEROL
BY Gordon Wood
ATTORNEY

Dec. 9, 1969 W. S. ROUVEROL 3,482,461
TRANSMISSION

Filed May 5, 1967 3 Sheets-Sheet 3

INVENTOR.
WILLIAM S. ROUVEROL
BY
Gordon Wood
ATTORNEY

United States Patent Office 3,482,461
Patented Dec. 9, 1969

3,482,461
TRANSMISSION
William S. Rouverol, 2120 Haste St.,
Berkeley, Calif. 94704
Filed May 5, 1967, Ser. No. 636,516
Int. Cl. F16h *15/12*
U.S. Cl. 74—198                                                18 Claims

ABSTRACT OF THE DISCLOSURE

A transmission of the type wherein power is transmitted between a pair of opposed disks by a roller interposed between the disks and mounted on an axis of rotation slantingly disposed relative to the disks. The tractive force between the roller and the disks is established by resiliently clamping the roller between the disks.

---

This invention relates to ball type transmissions of the type wherein power is transmitted between shafts by means of disks fixedly secured to the shafts and including one or more rollers interposed between the opposed faces of the disks. In certain respects the present invention is an improvement over the structures disclosed in U.S. Patent No. 2,132,801 and French Patents Nos. 467,198 and 997,276.

The main object of the present invention is the provision of a variable speed friction drive of improved efficiency, capacity and wear life.

Another object of the invention is the provision of a transmission wherein the correct tractive force between the disks and the traction roller is established in an economical and effective manner thereby bringing the cost of the transmission within practical limits.

Still another object of the invention is the provision of a transmission of a balanced type eliminating thrust bearings which would otherwise be so expensive as to render the use of the transmission impractical.

Yet another object of the invention is the provision of a friction drive transmission having a constant horsepower capacity at all speed ratios. In this connection in vehicular transmissions it is desirable to be able to transmit the maximum full throttle engine torque at all speeds, and this requires a constant input torque capacity equal to or greater than such maximum value. For industrial drives, on the other hand, nearly 85% require a constant output torque capacity. For this reason a transmission suitable for vehicular propulsion is also suitable for most industrial applications if it is turned end for end so that the input shaft becomes the output shaft and vice versa. The constant horsepower transmission of the present invention is therefore suitable for most applications.

Other objects and advantages will be apparent from the following specification and from the drawings.

Figure 1:
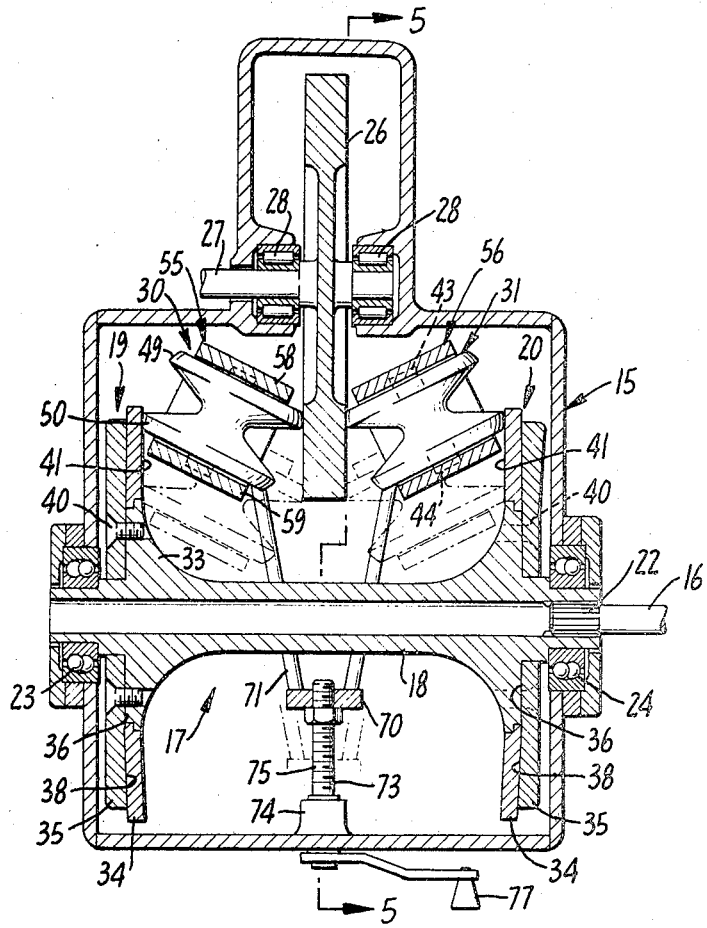
FIG. 1 is a top plan view of a preferred form of the invention employing one pair of friction rollers.
Figure 2:
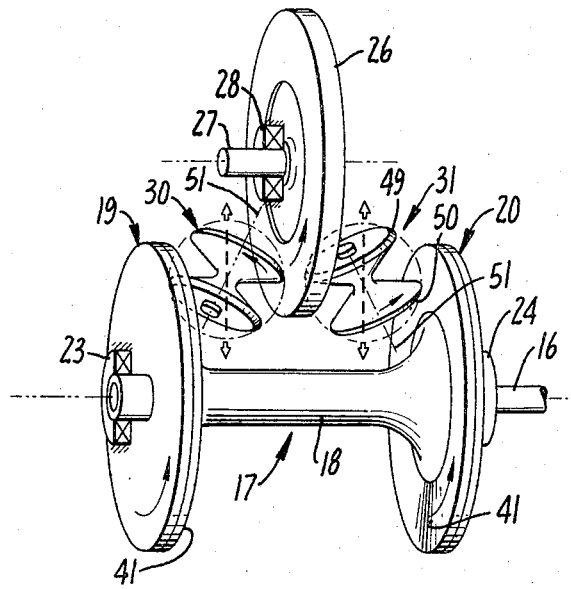
FIG. 2 is a semischematic perspective of the disk and roller arrangement of FIG. 1.

In detail, and first with reference to FIG. 1, the preferred form of the invention includes a housing generally designated 15 into which extends an input shaft 16 connected to a spool generally designated 17. Said spool includes a hub portion 18 and a pair of axially spaced disks generally designated 19 and 20 respectively. The input shaft 16 connects with spool 17 by means of a spline connection 22. The hub of spool 17 is rotatably supported on the opposite sides of housing 15 by means of a pair of self aligning bearings 23, 24 respectively.

Extending into the space between disks 19, 20 is a single disk 26 fixed to an output shaft 27 which in turn is rotatably supported on needle bearings 28.

Torque is transmitted from input shaft 16 to output shaft 27 by means of a pair of rollers generally designated 30, 31 which are interposed between the opposite faces of the single disk 26 and the opposed faces of the disks 19, 20 on spool 17.

It will be understood that to transmit a predetermined torque to disk 26 it is necessary to compress the rollers 30, 31 between said disk 26 and the disks 19, 20 with sufficient force to create the traction necessary to transmit the desired torque. By the present invention the compressive force on rollers 30, 31 is accurately predetermined by the structure shown in FIGS. 1, 3 and. 4 The hub 17 has radially enlarged stepped flanges 33 adjacent its ends which are adapted to receive the complementarily formed inner periphery of an annular hardened steel traction disk 34. An annular end plate 35 is received over each end of the hub 17 and is provided with a central planar inner surface 36 adapted to engage the adjacent end of hub 17. Outwardly of the adjacent end of hub 17 the end plate 35 is formed with an annular frustoconical surface 38 which engages the annular traction disk 34.

Figure 4:
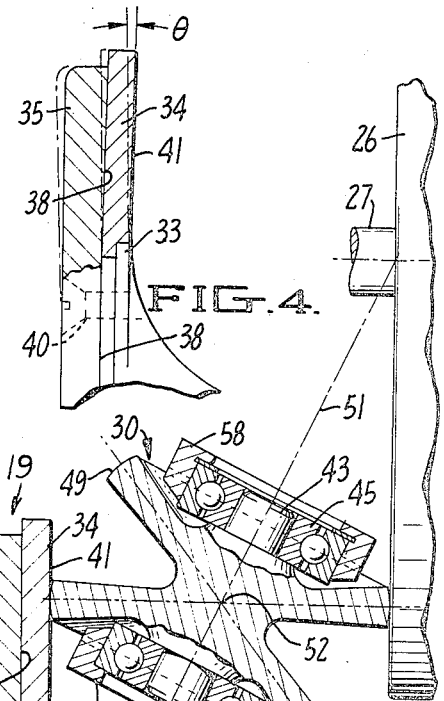
FIG. 4 is a fragmentary side elevation of one of the disks of the spool showing it in its normal undeflected condition.

An annular row of screws 40 are passed through end plate 35 and are threadedly received in the adjacent end of hub 17. It will be apparent that upon tightening screws 40 of the frustoconical annular surface 38 of end plate 35 causes the annular traction disk 34 to assume a dished shape as seen in FIG. 4, and also to be frictionally secured to spool 17. However, when the spool is assembled with the rollers 30, 31 in place as shown in FIG. 1 the compressive force on rollers 30, 31 causes the disks constituted by end plates 35, traction disks 34 and the enlarged portions of hub 17 to deflect outwardly away from each other so that the particular portion of the inwardly directed face 41 of each traction disk 34 adjacent rollers 30, 31 lies in a plane perpendicular to the axis of spool 17. In this connection it will be noted in FIG. 3 that this deflection is accompanied by a local bowing outwardly of end plates 35.

Figure 6:
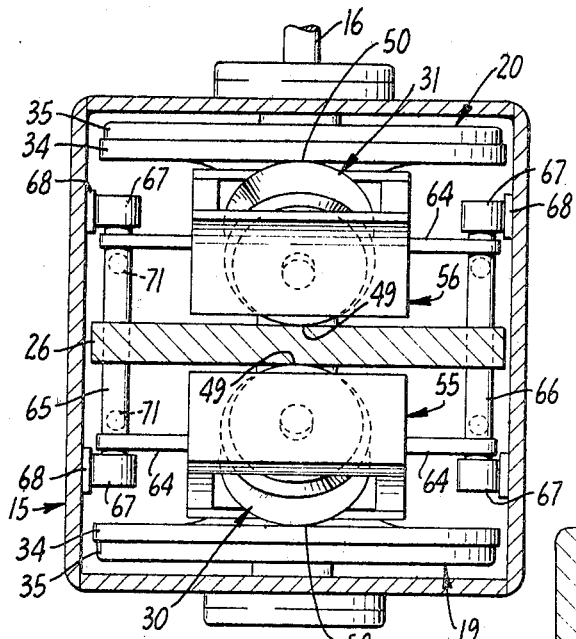
FIG. 6 is a transverse section showing the roller mounting carriage.
Figure 5:
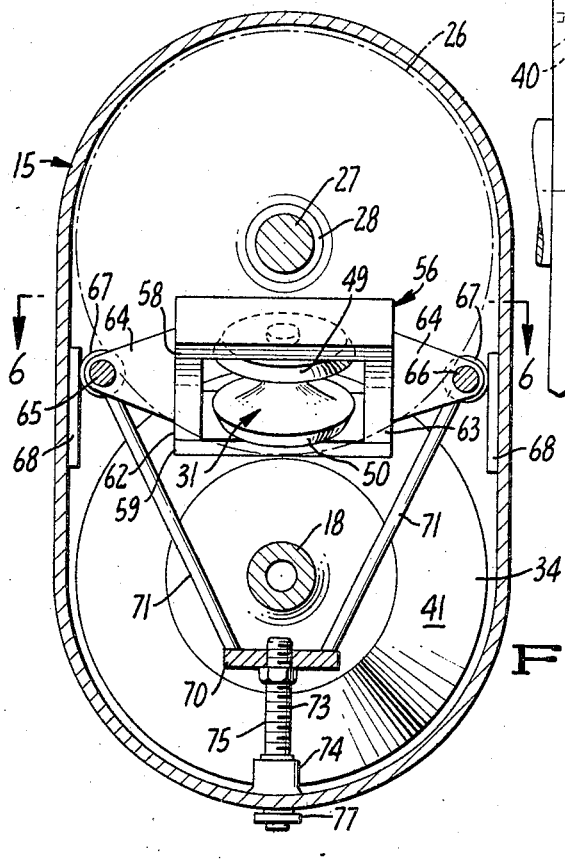
FIG. 5 is a sectional view of the transmission taken in a plane indicated by lines 5—5 of FIG. 1.

The rollers 30, 31 are identical and each is formed to provide a central body and a pair of integral bearing journals 43, 44 rotatably supported in bearings 45, 46 respectively. The body of each roller is formed to provide a pair of narrow lands 49, 50 symmetrically formed with respect to a central plane normal to the axis of rotation 51 of the roller. These lands or traction surfaces are preferably spherical surfaces with their center of curvature at the center 52 of the roller body. By this structure "point contract" is established between each roller and the disks it engages. , The bearings 45, 46 that rotatably support the friction rollers are in turn supported on frames 55, 56 respectively (FIG. 6). Said frames are generally box shaped and include a pair of opposed plates 58, 59 connected by end walls 62, 63 (FIG. 5). The frames 55, 56 are connected by lugs 64 to a pair of shafts 65, 66 provided at their opposite ends with rollers 67. Said rollers are adapted to roll along tracks 68 secured to the inner side of housing 15.

Figure 3:
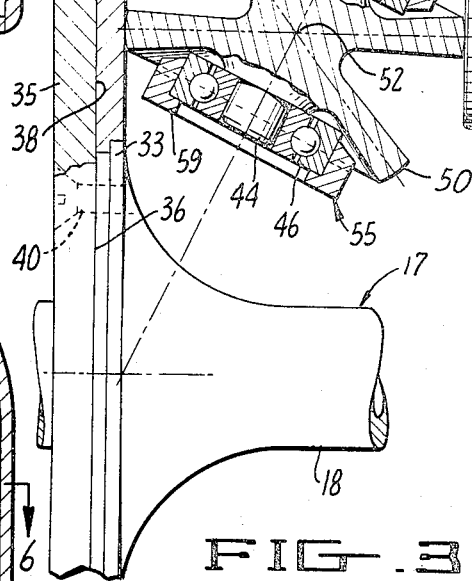
FIG. 3 is a greatly enlarged fragmentary plan view of one roller of FIG. 1 and its associated disks.

Shafts 65, 66 are connected to a single head 70 by means of a plurality of rods 71 which converge away from shafts 65, 66 and are secured at their outer ends to said head 70 and at their inner ends to the shafts 65, 66 (FIG. 5). Translatory movement of the frames 55, 56 is effected by means of a threaded shaft 73 which is rotatably supported in a bearing 74 secured to the side of housing 15 and is provided with screw threads 75 threadedly received within head 70. Shaft 73 may be provided at its outer end with a crank arm 77 for rotating shaft 73 and thus translating the rollers 30, 31 in the plane of the input and output shafts 16 and 27 respectively and to different distances relative to said shafts. In FIG. 3 the roller 30 is shown in its intermediate position corresponding to unity speed ratio in which position the center 52 of roller 30 is equidistant from the axes of disks 26, 19. It will be apparent that upon movement of the rollers 30, 31 toward shaft 27, the speed of the latter will be increased assuming the input speed remains constant. In order to reduce the speed ratio the rollers 30, 31 are moved toward the axis of disk 19.

One of the important features of the present invention is the "point contact" which exists between the rollers 30, 31 and their associated disks. Although the term "point contact" has a well understood meaning it is obvious that a true point contact in a geometric sense does not exist and that the roller and the associated disks engage each other over an area even though such area is extremely small. When a spherical ball is pressed against a flat plane a circular area of engagement results the radius of which is given by the following formula:

$$R = 0.88 \left(\frac{Fd}{E}\right)^{1/3}$$

where F is the load on the sphere, $d$ is its diameter and E the modulus of elasticity. Thus a 2″ diameter steel ball pressed against a steel plate with a force of 1200 lbs. produces a contact area in the form of a circle about $\frac{1}{16}$″ in diameter.

In the present invention the term "point contact" will therefore be understood to mean a "minimal" area of engagement, to wit, an area having a width transverse to the direction of rolling not appreciably greater than the area of engagement of a sphere of the same diameter as the roller. Although the contact surfaces of the rollers 30, 31 are preferably spherical in order to carry out the objects of the present invention it will be apparent that a close to minimal contact area may be achieved by forming the contact surfaces 49, 50 to shapes other than spherical. For example, parabolic and toroidal contact surfaces will result in substantially the same minimal area as results from the use of spherical surfaces. Furthermore it is possible to provide a contact area very close in magnitude to the minimal area contemplated by the present invention by the provision of a relatively short frustoconical land if this were desirable from a manufacturing point of view.

The reason for the importance of the minimal contact area referred to above lies in the fact that it is essential in a transmission of the type contemplated herein to minimize the wear at the contact points and to minimize the tendency of high speed rollers to lose traction as the result of oil driven into the contact zone by the hydrodynamic wedge effect which always occurs when there is relative motion between roller and disk. For example, in U.S. Patent No. 2,132,801 the above objects cannot be achieved because the rollers disclosed therein engage the disks along relatively long elements of frustoconical surfaces.

The principal disadvantage of tractive friction drives employing line contact as distinguished from point contact is that while such drives have optimum efficiency and capacity at one transmission ratio they cannot be shifted very far from this optimum ratio position without disastrous effects on performance. Upon such shifting from one particular transmission ratio the capacity, efficiency and wear life all drop off rapidly. For example, if the spherical surfaces 49, 50 of rollers 30, 31 were replaced by frustoconical surfaces having their apexes intersecting the axes of disks 26, 19 as shown in FIG. 3 at unity ratio, such a conical roller would have pure rolling contact for the entire length of its line of contact with both disks and the drive would have excellent efficiency in capacity. However, to have any utility in either vehicular or industrial transmissions, a friction drive must have a range of outputs such that the maximum is at least four times the minimum. Hence the minimum speed ratio must be at least 1:2 and the maximum speed at least 2:1. These minimum extreme ratios would be achieved when the center of the roller is twice as close to one disk axis as it is to the other (i.e. at the third points of a line joining the driving and driven disk axes).

At these extreme positions a roller having spherical contact surfaces ("point contact") would impose on the edges of the small contact area a slip velocity of slightly less than 1% of the disk velocity due to the difference in the angular velocity of the disk and the component of angular velocity of the roller normal to the disk face. In the case of a similar roller having even comparatively narrow conical faces, say ¼ of the roller diameter in width, the imposed slip velocity at these extreme ends of the contact line is nearly 7% of the disk velocity at the center of the contact line. In other words, the outer edge of the roller surface is running 7% slower than the adjacent surface of the disk and the inner edge 7% faster than the surface adjacent to it. As a result a considerable portion of the power delivered to the roller at its outer edge is delivered back to the disk at the roller's inner edge. The overall effect of this is a 7% power loss which is transferred into heat at the contact line. Needless to say with this amount of power going into heat through the medium of an oil film only a few microns thick, the amount of power that can be transmitted without vaporizing the oil film is extremely small.

In addition the high slip rates at the ends of the contact line, together with the inclination of the conical roller create a hydrodynamic wedge causing the end portions of the conical roller to develop the greatest oil film pressure and to relieve the center section of the roller from most of its load. As a result most of the power tends to be transmitted through the ends of the contact line and the slip loss in that area becomes the slip loss for the roller as a whole.

In the case of the spherical roller, on the other hand, the relative rotation of disk and roller about an axis normal to the disk surface has more of a grinding action than a wedge action and hence does not tend to increase the film thickness due to the hydrodynamic pumping. The major load therefore remains at the center of the small circle of contact and the 1% slip imposed on the outer periphery of this area occurs when the pressures, as governed by the Hertzian stress distribution, are considerably less than the pressures in the center of the contact area. Hence the power losses due to differential spin velocities normal to the contact surface are substantially less than 1% of the power transmitted and are in fact closer to ½%. This is true at both extreme speed ratios of 1:2 as well as 2:1.

Since the present invention is directed to the provision of a transmission suitable for vehicular use as well as industrial use, it will be apparent that such transmission must have the maximum possible capacity for its size. Since the amount of torque that can be transmitted by tractive friction is rather limited the only remaining variable that can be increased in order to increase the power capacity is speed. The present invention is therefore intended to be operated as fast as the disks can run without local heating due to oil film shear at the contact points generating heat sufficient to vaporize the oil film. Since the maximum rate of shearing work in the case of a spherical roller is only about 1/10 that for a conical roller it will be evident that a transmission with spherical rollers can be run approximately ten times as fast and hence for the same disk size and roller pressure will deliver ten times as much power.

In addition to the spool of construction incorporated in the preferred form of the invention disclosed herein the present invention also contemplates a structure such as that generally shown in FIG. 3 wherein only two disks are involved and the balanced arrangement of FIG. 1 is not employed. However, it will be apparent that an important advantage resulting from the spool type of assembly of FIG. 1 is that axially directed loads on the shafts 16, 27 are balanced so that there is no need for thrust bearings. The use of such thrust bearings in the present invention would require operation at much lower speeds, lower power capacities and lower efficiencies than are possible in the case of the balanced configurations disclosed herein.

Figures 9, 10:
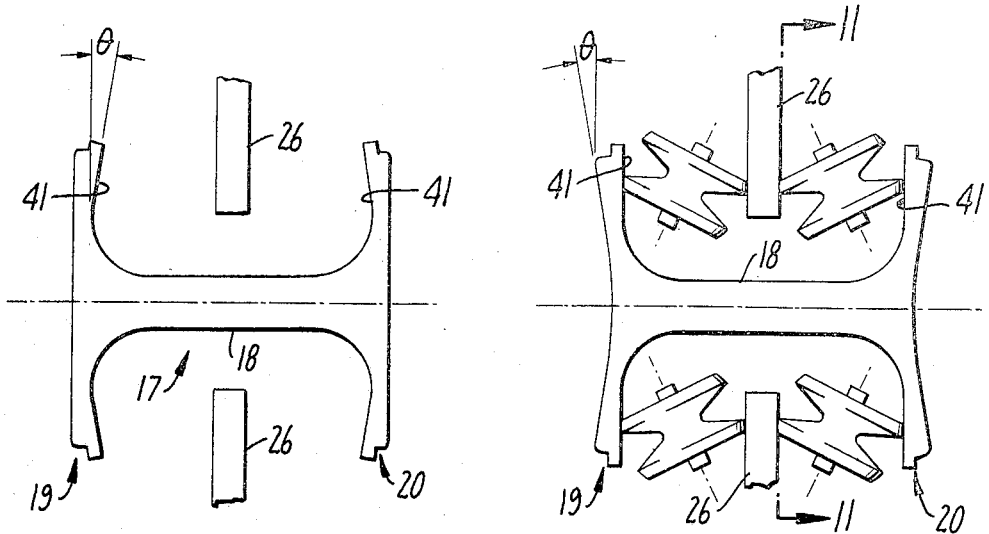
FIGS. 9 and 10 are similar schematic views showing the deformation of the spool in the form of the invention employing a plurality of pairs of friction rollers.
Figure 11:
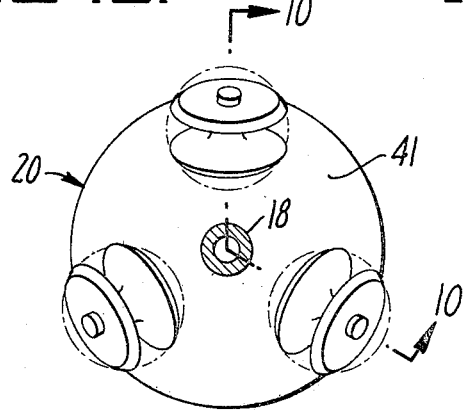
FIG. 11 is a vertical section taken in the plane indicated by lines 11—11 in FIG. 10.

In addition to the "one roller" form of the invention it is also contemplated that in lieu of the asymmetrical arrangement of FIG. 1 a symmetrical arrangement may be provided as shown in FIGS. 9 to 11. In this case, although the rollers are employed in pairs, a plurality of such pairs are positioned about the spool 17 and each pair is provided with its appropriate shifting means (not shown) for translating the same in order to effect different speed ratios.

Figures 7, 8:
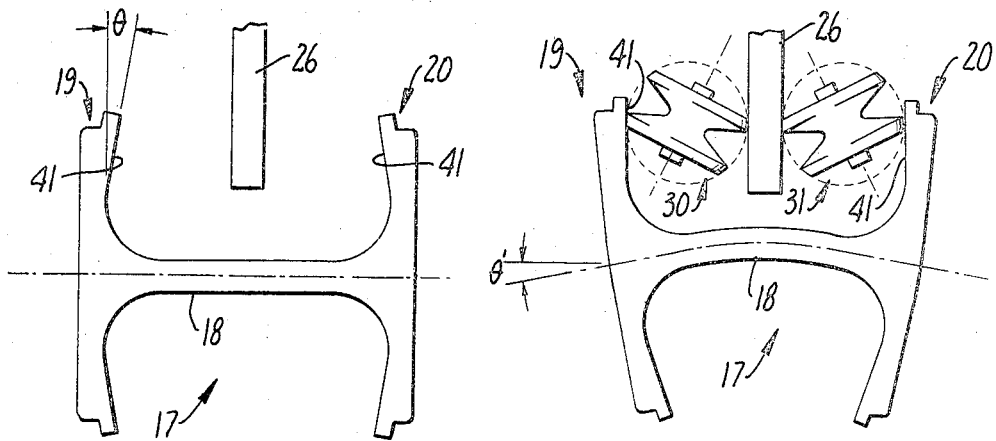
FIGS. 7 and 8 are greatly exaggerated schematic views showing the deformation of the spool in the form of the invention employing a single pair of friction rollers.

In FIGS. 7 and 8 the means for loading a single pair of rollers is illustrated schematically, as is the effect of forming the disks, 19, 20 in the manner hereinbefore described in detail. In FIG. 7 it is seen that the unloaded form of the spool 17 is provided with traction faces which make an angle $\theta$ with a plane perpendicular to the axis of the spool. When the rollers are interposed between the disks as shown in FIG. 8 the faces 41 of disks 19, 20 at their points of engagement with the rollers become perpendicular to the axis of the spool regardless of the particular position to which the rollers 30, 31 are shifted. The above described method of clamping the rollers between the disks is important in carrying out one of the major objects of the present invention which is to provide a transmission having a constant horsepower capacity at all engine speeds.

With reference to FIGS. 7 and 8 the angle $\theta'$ through which the disks tilt in response to the roller force F is expressed by the equation:

$$\theta' = \frac{FaL}{2EI}$$

where F is the force between rollers and disk faces, $a$ the offset of the roller centers from the spool axis, L the effective length of the spool shaft, E the modulus of elasticity of the shaft and I the plane moment of inertia of the shaft about its diameter.

The dishing angle $\theta$ of the disks is imposed on the disk faces by the tightening effect of screws 40 and the frustoconical surface 38 of end plates 35. The above equation shows that for a desired roller load F at a particular offset $a$ the angle $\theta'$ may be varied by varying I (which is readily done by varying the shaft diameter). By making L equal to the sum of two roller diameters plus the thickness of the driven disk it is automatically insured that the roller faces remain substantially parallel for all offsets $a$ of the rollers. This insures that $\theta$ equals $\theta'$ at all times and since L, E, and I are constant in the above equation the product $F \cdot a$ must also be constant.

The maximum tractive force for this type of transmission is equal to the normal load F times a coefficient of tractive friction $\mu$. Hence, for the arrangement shown in FIGS. 7, 8, the torque capacity T is equal to $2F\mu a$.

Since the tractive friction coefficient for "point contact" is substantially constant (in the range of 0.07 to 0.08) and the product of F and $a$ is required by the equation for $\theta'$ to remain constant, the above equation for torque capacity I shows that T must also be constant and the transmission will therefore have the constant torque characteristic which is so desirable for the reasons noted above.

For a vehicle transmission this constant torque is a desirable feature not only for enabling the transmission to handle maximum engine torque T at all speed ratios but also because it enables this to be accomplished with reduced normal load F at high ratios (when the distance $a$ is large). Since most vehicle operation occurs at the higher transmission ratios (high gear) the low roller loads associated with this predominantly high ratio operation will double or treble the service life of the transmission.

With respect to the symmetrical arrangement shown in FIGS. 9 to 11, although the mathematical formulae are different, an analogous result obtains; that is, a substantially constant torque capacity results.

It will be understood that at unity speed ratio as shown in FIG. 3 the component of spin velocity of the transmitting roller normal to the disk surface is exactly equal to the angular velocity of the disk by virtue of the fact that the axes of rotation of each pair of bodies in contact intersect the plane of contact at a common point. The result of this is that at unity ratio relative motion between the roller and its associated disks is zero. When the rollers are moved away in either direction from the unity speed ratio position relative motion between the roller and disks does occur but, as pointed out above, such relative motion is minimized so that the actual power loss is very close to only ½% of the power transmitted. This result is in part attributable to the fact that "minimal contact area" exists between the roller and its associated disks, and in part by utilizing a tilted axis roller that is shiftable more or less equal distances to each side of the ideal zero-relative-velocity condition at unity ratio.

From the above explanation it will be obvious that numerous advantages accrue from the transmission herein disclosed. First, the fact that the rollers are rotatable about axes tilted relative to the input and output shafts results in two annular rolling surfaces instead of one which would be the case if the rollers were supported about an axis of rotation perpendicular to the shafts. The practical result of this is that the wear life of the transmission is doubled.

The use of "minimal contact areas" and preferably spherical surfaces on the rollers in conjunction with a tilted axis of rotation also minimizes power loss and maximizes allowable speed, and hence capacity, of the transmission.

Both of the above noted features, that is, the tilted axes of the rollers and their spherical friction surfaces, contribute to provide still another advantage: the hydrodynamic wedge effect of the oil film in the contact area is minimized thus further reducing wear and any tendency for the rollers to lose traction.

The above described spool construction wherein axially directed loads on the bearings are balanced eliminates expensive thrust bearings and thus contributes to economy of construction.

It should also be emphasized that as the rollers are shifted away from the input shaft 16 the compressive force F is reduced in proportion to the distance from said shaft. However, since such distance multiplied by the force equals the torque it is apparent that the torque remains constant as the speed increases and at the same time the tractive force is reduced thereby further minimizing wear.

The invention contemplates further modifications not specifically disclosed above. For example, the resilient loading of the disks on the rollers may be accomplished by a spring (for example a Bellville spring on the input spool). It will also be apparent that various available torque proportional loading devices may be provided for the disks.

With respect to the rollers 30, 31 it will be apparent that a central bearing may be formed on said rollers in lieu of the two end bearings herein disclosed.

Although the invention contemplates as a preferred form of roller shifting means a device analogous to that shown in the drawings, it will be apparent that, if it were found desirable, means could be provided for changing the angle of the axis of the roller as it moves toward or away from its unity position. Such a procedure might be desirable under certain circumstances for minimizing the shearing work at the outer edge of the small contact area.

I claim:
1. In a transmission,
   an input disk and an output disk in generally opposed relation,
   means supporting said disks for rotation about offset and substantially parallel axes,
   a roller interposed between said disks and in rolling engagement at its opposite sides with the opposed faces of said disks respectively,
   means rotatably supporting said roller for rotation only about a particular axis coplanar with the plane of said disk axes and slantingly disposed relative to said disk axes,
   said roller being formed to provide a minimal contact area substantially no greater in width transverse to the direction of rolling than the area of engagement of a spherical ball having a diameter equal to the spacing between said opposed faces.

2. A transmission according to claim 1 wherein said roller is resiliently compressed between said faces with a force that varies substantially depending on the relative distances from the center of the roller to the axes of said disks.

3. A transmission according to claim 2 wherein the normal spacing between said faces is less than the rolling diameter of said roller whereby the interposition of said roller between said faces deflects one of said disks in a direction away from the other of said disks.

4. A transmission according to claim 1 wherein said opposite sides of said roller are formed to spherical surfaces with the center of curvature of said surfaces on the axis of rotation of said roller.

5. A transmission according to claim 1 wherein the axis of said roller intersects said faces at said disks axes when said roller is equally spaced from said axes.

6. A transmission according to claim 1 wherein a shiftable support is provided for said roller to permit the latter to be shifted so that said particular axis occupies different positions in said plane relative to said disk axes.

7. A transmission for transmitting power between a pair of shafts supported for rotation about spaced apart parallel axes comprising:
   a pair of disks axially spaced apart along one of said shafts and fixedly secured thereto,
   the other of said shafts being provided with a single disk extending into the space between said pair of disks,
   a pair of rollers interposed between the opposite faces of said single disk and the opposed faces of said pair of disks,
   means rotatably supporting said rollers for rotation about particular intersecting axes coplanar with the plane of said shaft axes and slantingly disposed relative to said axes,
   means resiliently urging said pair of disks toward each other at said rollers for compressing the latter between said pair and said single disk,
   said rollers being formed to provide a minimal contact area of engagement with said disks substantially no greater in width transversely to the direction of rolling than the area of engagement of a spherical ball of a diameter equal to the spacing between said single disk and said pair of disks.

8. A transmission according to claim 7 wherein said rollers are formed to substantially spherical surfaces at their points of engagement with said faces whereby said engagement is substantially point contact and whereby the four points of engagement of said rollers with said faces are substantially colinear.

9. In a transmission,
   a first shaft provided with a pair of disks axially spaced apart along said shaft and fixedly secured thereto,
   a second shaft parallel to said first shaft and provided with a single disk extending into the space between said pair,
   a pair of rollers in rolling engagement with the opposite faces of said single disk and with the opposed faces of said pair of disks,
   said first shaft, disks and rollers being assembled to provide an interference fit between said rollers and disks whereby the faces of said pair of disks at said rollers are deflected away from each o'her primarily against the inherent resiliency of said first shaft and pair of disks.

10. A transmission according to claim 9 wherein each of said rollers is formed to provide a minimal contact area of engagement with said disks substantially no greater in width transverse to the direction of rolling than the area of engagement of a spherical ball of diameter equal to the spacing between said single disk and said pair of disks.

11. A transmission according to claim 9 wherein means are provided rotatably supporting said rollers for rotation about particular intersecting axes coplanar with the plane of said shaft axes and slantingly disposed relative to said axes.

12. In a transmission,
   a first disk and a second disk in generally opposed relation,
   means supporting said disks for rotation about offset and substantially parallel axes,
   a roller interposed between said disks and in rolling engagement at its opposite sides with the opposed faces of said disks respectively,
   a frustoconical surface on said opposed face of said first disk,
   said first disk and said second disk being assembled to provide an interference fit between said roller and said opposed faces,
   whereby the inherent resiliency of said disks and said means supporting said disks for rotation provides a force compressing said roller between said opposed faces,
   the cone angle of said frustoconical surface and the degree of said interference fit being such that after assembly the elements of said frustoconical surface at the point at which said roller bears becomes substantially parallel to the surface of said second disk at the point where said second disk bears against said roller.

13. A transmission according to claim 12 wherein said roller is formed to provide a minimal contact area substantially no greater in width transverse to the direction of rolling than the area of engagement of a spherical ball having a diameter equal to the spacing between said opposed faces.

14. A transmission according to claim 12 wherein means are provided rotatably supporting said roller for rotation about a particular axis coplanar with the plane of said disk axes and slantingly disposed relative to said axes.

15. In a ball disk drive,
   a pair of spaced apart disks mounted for rotation about a substantially common axis,
   a single disk mounted for rotation about an axis parallel to and offset from the axis of said pair of disks and extending into the space between said pair of disks, a pair of rollers interposed between the opposite faces of said single disk and the opposed faces of said pair of disks, a shiftable support mounting said rollers for rotation in positions wherein the contact areas between said rollers and said disks are intersected by the plane of said axes, means for shifting said support toward or away from said common axis, a tension member connecting said pair of disks and rotatable therewith, said disks, rollers and tension members being proportioned so that assembly of said pair of disks onto said tension member creates an interference fit that applies against said rollers a resilient force that alters significantly as the displacement of said rollers from said common axis is altered.

16. A drive according to claim 15 wherein said disks and tension member are proportioned so that said force varies substantially in direct proportion to the displacement of said rollers from one of said axes.

17. A drive according to claim 15 wherein said rollers are formed to provide a minimal contact area substantially no greater in width transverse to the direction of rolling than the area of engagement of a spherical ball having a diameter equal to the spacing between the opposed surfaces of said single disk and said pair of disks.

18. A drive according to claim 15 wherein said rollers are mounted for rotation about axes slantingly disposed relative to said disk axes.

References Cited

UNITED STATES PATENTS

| | | | |
|---|---|---|---|
| 2,936,638 | 5/1960 | Wassilieff | 74—200 |
| 3,242,748 | 3/1966 | Prager | 74—200 |
| 3,010,330 | 11/1961 | Perruca | 74—200 |
| 3,030,817 | 4/1962 | Tomaszek et al. | 74—200 |
| 3,033,048 | 5/1962 | Perruca | 74—200 |
| 3,115,044 | 12/1963 | Andrews | 74—200 |

FRED C. MATTERN, Jr., Primary Examiner

JAMES A. WONG, Assistant Examiner

U.S. Cl. X.R.

74—200